(12) United States Patent
Hsu et al.

(10) Patent No.: US 11,968,712 B2
(45) Date of Patent: Apr. 23, 2024

(54) SHARED WIRELESS FIDELITY COMMUNICATION DEVICE FOR CONTROLLING OPERATIONS OF STATION DURING SHARED PERIOD THAT IS PART OF TIME PERIOD OF TRANSMISSION OPPORTUNITY OBTAINED BY SHARING ACCESS POINT

(71) Applicant: MEDIATEK INC., Hsin-Chu (TW)

(72) Inventors: Chien-Fang Hsu, Hsinchu (TW); James Chih-Shi Yee, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 54 days.

(21) Appl. No.: 17/213,246

(22) Filed: Mar. 26, 2021

(65) Prior Publication Data

US 2021/0315010 A1 Oct. 7, 2021

Related U.S. Application Data

(60) Provisional application No. 63/005,491, filed on Apr. 6, 2020.

(51) Int. Cl.
*H04W 56/00* (2009.01)
*H04W 72/0446* (2023.01)
*H04W 72/53* (2023.01)
*H04W 74/00* (2009.01)
*H04W 74/0816* (2024.01)

(52) U.S. Cl.
CPC ... *H04W 74/0816* (2013.01); *H04W 72/0446* (2013.01); *H04W 72/53* (2023.01); *H04W 74/008* (2013.01)

(58) Field of Classification Search
CPC ........ H04W 74/0816; H04W 72/0446; H04W 72/0493; H04W 74/008
USPC ......................................................... 370/329
See application file for complete search history.

(56) References Cited

U.S. PATENT DOCUMENTS

| | | | |
|---|---|---|---|
| 2012/0008490 A1 | 1/2012 | Zhu | |
| 2014/0177517 A1* | 6/2014 | Koskela | H04B 7/15542 370/315 |
| 2019/0007253 A1* | 1/2019 | Cavalcanti | H04L 5/0041 |
| 2020/0076519 A1* | 3/2020 | Asterjadhi | H04L 1/0027 |
| 2020/0359230 A1* | 11/2020 | Yerramalli | H04L 5/0048 |
| 2021/0143884 A1* | 5/2021 | Kwon | H04W 74/0816 |
| 2021/0282161 A1* | 9/2021 | Sun | H04W 72/20 |
| 2021/0315009 A1* | 10/2021 | Xia | H04W 12/06 |
| 2022/0217770 A1* | 7/2022 | Sun | H04W 74/006 |

FOREIGN PATENT DOCUMENTS

| | | |
|---|---|---|
| CN | 104053243 A | 9/2014 |
| CN | 105578423 A | 5/2016 |
| CN | 107787018 A | 3/2018 |

* cited by examiner

*Primary Examiner* — Sai Ming Chan
(74) *Attorney, Agent, or Firm* — Winston Hsu

(57) ABSTRACT

A shared wireless fidelity (WiFi) communication device receives a first frame transmitted from a sharing access point (AP), and transmits a second frame to a non-AP station (STA). The first frame at least contains information of a shared period that is allowed to be used by the shared WiFi communication device, and the shared period is a subset of a time period of transmission opportunity (TXOP) obtained by the sharing AP. The second frame at least contains the information of the shared period.

24 Claims, 3 Drawing Sheets

SHARED WIRELESS FIDELITY COMMUNICATION DEVICE FOR CONTROLLING OPERATIONS OF STATION DURING SHARED PERIOD THAT IS PART OF TIME PERIOD OF TRANSMISSION OPPORTUNITY OBTAINED BY SHARING ACCESS POINT

CROSS REFERENCE TO RELATED APPLICATIONS

This application claims the benefit of U.S. provisional application No. 63/005,491, filed on Apr. 6, 2020 and incorporated herein by reference.

BACKGROUND

The present invention relates to wireless communications, and more particularly, to a shared wireless fidelity (WiFi) communication device for controlling operations of a station during a shared period that is a part of a time period of transmission opportunity obtained by a sharing access point.

In a wireless fidelity (WiFi) communication system, an access point (AP) of a first basic service set (BSS) may communication with an AP of a second BSS, and may communicate with one or more non-AP stations (STAs) in the first BSS. With advance of the WiFi communication technology, multi-AP coordination (e.g. coordinated and joint transmissions) is proposed. In a multi-AP coordination system, among a set of APs, an AP can share its resources to other AP(s) in the set. A sharing AP is defined as an AP that provides its resource to other AP (s). A shared AP is defined as an AP that receives the shared resource from the sharing AP. For example, in accordance with a coordinated time division multiple access (TDMA) scheme, a sharing AP can share a part of a time period of its transmission opportunity (TXOP) to a shared AP, and the shared AP can utilize the shared period for certain transmission scheme. Thus, there is a need for an innovative signaling design to coordinate operations of WiFi communication devices during the shared period.

SUMMARY

One of the objectives of the claimed invention is to provide a shared wireless fidelity (WiFi) communication device for controlling operations of a non-AP station during a shared period that is a part of a time period of TXOP obtained by a sharing AP.

According to a first aspect of the present invention, an exemplary shared wireless fidelity (WiFi) communication device is disclosed. The exemplary shared WiFi communication device is arranged to receive a first frame transmitted from a sharing access point (AP) and transmit a second frame to a non-AP station (STA). The first frame at least contains information of a shared period that is allowed to be used by the shared WiFi communication device, and the shared period is a subset of a time period of transmission opportunity (TXOP) obtained by the sharing AP. The second frame at least contains the information of the shared period.

According to a second aspect of the present invention, an exemplary method for sharing resources of a sharing access point (AP) is disclosed. The exemplary method includes: receiving a first frame transmitted from the sharing AP, wherein the first frame at least contains information of a shared period that is allowed to be used by a shared wireless fidelity (WiFi) communication device, and the shared period is a subset of a time period of transmission opportunity (TXOP) obtained by the sharing AP; and in response to receiving the first frame, transmitting a second frame to the sharing AP for confirmation of receiving the first frame, and further transmitting a third frame to a non-AP station (STA), wherein the third frame at least contains the information of the shared period.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
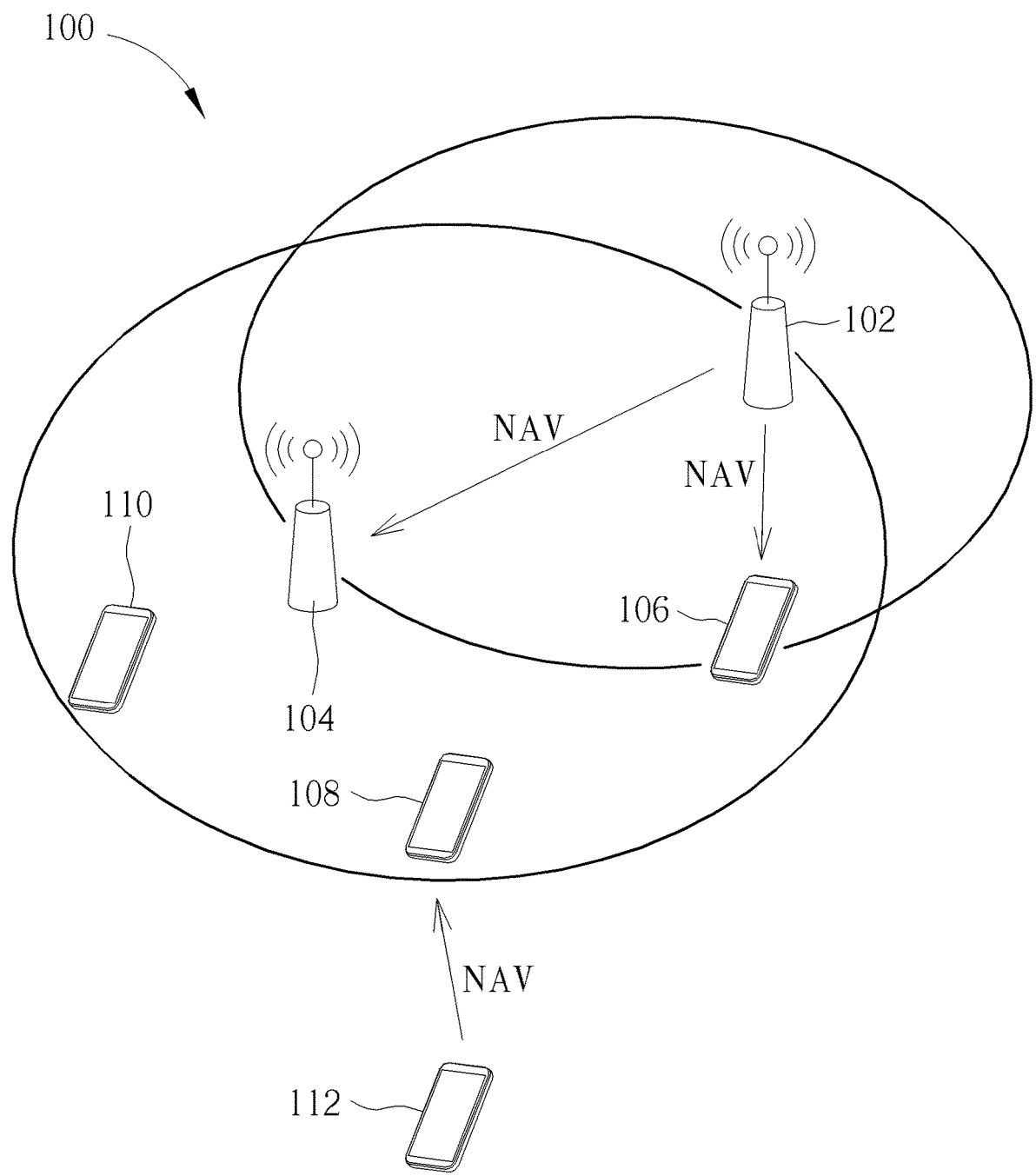
FIG. 1 is a diagram illustrating a WiFi system with coordinated TDMA according to an embodiment of the present invention.

FIG. 1 is a diagram illustrating a WiFi system with coordinated TDMA according to an embodiment of the present invention. The WiFi system 100 is composed of a plurality of WiFi communication devices, including a sharing access point (AP) 102, a shared AP 104, non-AP stations (STAs) 106, 108, 110, and one WiFi communication device 112 that may be an AP or a non-AP STA. When the sharing AP 102 obtains a transmission opportunity (TXOP) and is willing to share a part of a time period of its TXOP to the shared AP 104, the sharing AP 102 may send a message to inform the shared AP 104. In this embodiment, the message may be unicasted to the shared AP 104 so that non-AP STAs (e.g. 106, 108, and 110) in the basic service set (BSS) of the shared AP 104 are not aware of the shared resources, and may be a frame containing information of shared TXOP parameters. For example, the frame from the sharing AP 102 to the shared AP 104 may contain information about the starting and ending time of the shared period (i.e. shared TXOP), the bandwidth of the shared TXOP, etc. The bandwidth of the shared TXOP may be equal to or less than the operating bandwidth of the sharing AP 102, and may only partially overlap the operating bandwidth of the sharing AP 102, but shall overlap the primary band of the shared AP 104. In addition, the sharing AP 102 has done its best to set up a network allocation vector (NAV) as indicated by a duration field carried by a valid frame sent from the sharing AP 102. The NAV is a virtual carrier-sensing mechanism. A frame header may contain the duration field that specifies the wireless medium will be busy. For example, a non-AP STA listening on the wireless medium reads the duration field and sets its NAV by the duration field, which is an indicator for a non-AP STA on how long it must defer from accessing the wireless medium. Specifically, the NAV may be thought of as a counter, which is initialized by the duration field sent from the NAV owner, and counts down to zero at a uniform rate. When the counter is zero, the virtual carrier-sensing indication shows that the wireless medium is idle. However, when the counter is nonzero, the virtual carrier-sensing indication shows that the wireless medium is busy.

The shared AP 104 is aware of TXOP obtained by the sharing AP 102 and NAV set up by the sharing AP 102, and is also aware of the shared period it is allowed to use. In the BSS of the shared AP 104, non-AP STA's NAV can be in three different conditions during the shared period. In a first condition, group-A non-AP STAs (e.g. 106) receive the NAV set up by the sharing AP 102 and set their NAVs synchronized with the sharing AP 102, where NAVs set in the group-A non-AP STAs (e.g. 106) are inter-BSS NAVs. In a second condition, group-B non-AP STAs (e.g. 108) do not receive the NAV set up by the sharing AP 102 and set their NAVs from overlapping BSS (OBSS) AP or non-AP STA (e.g. 112) and/or intra-BSS STA doing peer-to-peer (P2P) transmission, where NAVs set in the group-B non-AP STAs (e.g. 108) are inter-BSS NAVs and/or intra-BSS NAVs, and each NAV not set up by the sharing AP 102 partially or fully overlaps the shared period. In a third condition, group-C non-AP STAs (e.g. 110) do not set up any NAV.

The shared period is a subset of the time period of TXOP obtained by sharing AP 102. The shared AP 104 can utilize at least a portion (i.e. part or all) of the shared period for certain transmission scheme. In a first transmission scheme, the shared AP 104 allows non-AP STAs in its BSS to contend the wireless medium by enhanced distributed channel access (EDCA) mechanism. In a second transmission scheme, the shared AP 104 uses trigger frames to trigger uplink (UL) transmission from non-AP STAs in its BSS. In a third transmission scheme, the shared AP 104 divides the shared period into several time segments and allocate each time segment to selected non-AP STA(s). Ina fourth transmission scheme, the shared AP 104 transmits downlink (DL) traffic to non-AP STAs in its BSS. The present invention focuses on the first transmission scheme, the second transmission scheme, and the third transmission scheme that are relevant to STA's operations.

Figure 2:
FIG. 2 is a diagram illustrating a signaling design for coordinating operations of WiFi communication devices under coordinated TDMA according to an embodiment of the present invention.
Figure 2:
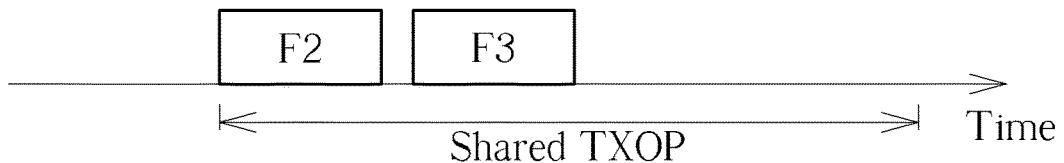

The transmission scheme can be announced by a frame (e.g. broadcast frame) to non-AP STAs associated to the shared AP 104. FIG. 2 is a diagram illustrating a signaling design for coordinating operations of WiFi communication devices under coordinated TDMA according to an embodiment of the present invention. The shared AP 104 receives one frame (e.g. unicast frame) F1 transmitted from the sharing AP 102, where the frame F1 contains information about the starting and ending time of the shared period, the bandwidth of the shared TXOP, etc. In response to receiving the frame F1, the shared AP 104 transmits one frame F2 to the sharing AP 102 for confirmation of receiving the frame F1, and then transmits another frame (e.g. broadcast frame) F3 to non-AP STAs in its BSS. It should be noted that the frame F2 is to respond to the frame F1 only, and carries no other information of the shared TXOP.

Consider a case where the first transmission scheme is adopted by the shared AP 104 to allow non-AP STAs in its BSS to contend the wireless medium by EDCA mechanism. For all non-AP STAs (e.g. 106, 108, and 110) in the BSS of the shared AP 104, the frame F3 contains information of the shared period (e.g. starting and ending time of the shared period) and identification information of the sharing AP 102 (e.g. media access control (MAC) address or BSS color of the sharing AP 102). The non-AP STAs need to record the NAV owner's identification information, such that they can temporarily disable NAV set up by the NAV owner.

For each of the group-A non-AP STAs (e.g. 106), the frame F3 further contains information that notifies the non-AP STA (e.g. 106) of ignoring the NAV (which is directly set up by the sharing AP 102) during the shared period, being free to perform channel contention during the shared period, resuming the NAV (which is directly set up by the sharing AP 102) when the shared period ends, and/or limiting UL transmission within the shared period when winning the channel contention.

For each of the group-B non-AP STAs (e.g. 108), the frame F3 further contains information that notifies the non-AP STA (e.g. 108) of respecting one or more NAVs not set up by the sharing AP 102 (i.e. no transmission during NAV(s)) during the shared period, and/or allowing of channel contention after one or more NAVs not set up by the sharing AP 102 end and before the shared period ends.

For each of the group-C non-AP STAs (e.g. 110), the frame F3 further contains information that notifies the non-AP STA (e.g. 110) of setting up a NAV that is identical to that set up by the sharing AP 102, ignoring the NAV (which is set up via the shared AP 104) during the shared period, being free to perform channel contention during the shared period, resuming the NAV (which is set up via the shared AP 104) when the shared period ends, and/or limiting UL transmission within the shared period when winning the channel contention.

In one alternative design, for each of the group-C non-AP STAs (e.g. 110), the frame F3 may contain information that notifies the non-AP STA (e.g. 110) of being free to perform channel contention during the shared period. That is, the non-AP STA (e.g. 110) can contend the wireless medium as normal operations, without addition instructions from the shared AP 104. In another alternative design, for each of the group-C non-AP STAs (e.g. 110), the frame F3 may contain information that notifies the non-AP STA (e.g. 110) of being free to perform channel contention during the shared period, and/or limiting the UL transmission within the shared period when winning the channel contention.

Consider a case where the second transmission scheme is adopted by the shared AP 104 to uses trigger frames to trigger UL transmission from non-AP STAs in its BSS. The trigger frame may be a broadcast frame used to allocate resources for a specific UL multi-user orthogonal frequency division multiple access (OFDMA) transmission. For example, to request a group of users (e.g. non-AP STAs) to perform an UL MU transmission, the shared AP 104 transmits a trigger frame containing a list of users involved in the transmission and user-specific information including resource unit (RU) allocation, modulation and coding scheme, etc.

For all non-AP STAs (e.g. 106, 108, and 110) in the BSS of the shared AP 104, the frame F3 contains information of the shared period (e.g. starting and ending time of the shared period), identification information of the sharing AP 102

(e.g. MAC address or BSS color of the sharing AP 102), and information indicating that only trigged UL transmission is allowed (i.e. no channel contention is permitted). The non-AP STAs need to record the NAV owner's identification information, such that they can temporarily disable NAV set up by the NAV owner.

For each of the group-A non-AP STAs (e.g. 106), the frame F3 further contains information that notifies the non-AP STA (e.g. 106) of ignoring the NAV (which is directly set up by the sharing AP 102) during the shared period, and/or resuming the NAV (which is directly set up by the sharing AP 102) when the shared period ends.

For each of the group-B non-AP STAs (e.g. 108), the frame F3 further contains information that notifies the non-AP STA (e.g. 108) of respecting one or more NAVs not set up by the sharing AP 102 (i.e. no transmission during NAV(s)) during the shared period.

For each of the group-C non-AP STAs (e.g. 110), the frame F3 further contains information that notifies the non-AP STA (e.g. 110) of setting up a NAV that is identical to that set up by the sharing AP 102, ignoring the NAV (which is set up via the shared AP 104) during the shared period, and/or resuming the NAV (which is set up via the shared AP 104) when the shared period ends. In one alternative design, for each of the group-C non-AP STAs (e.g. 110), the frame F3 contains no instructions for the non-AP STA during the shared period.

Figure 3:
FIG. 3 is a diagram illustrating another signaling design for coordinating operations of WiFi communication devices under coordinated TDMA according to an embodiment of the present invention.
Figure 3:
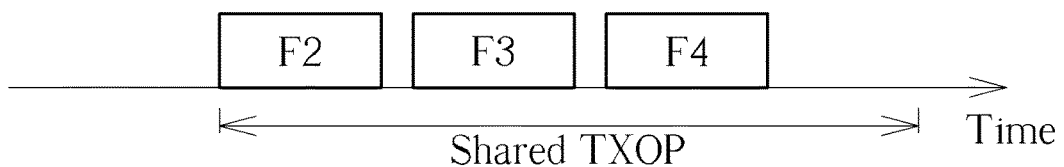

In this embodiment, the NAV ignorance notice is sent to group-A and group-C non-AP STAs by the frame (e.g. broadcast frame) F3. However, this is for illustrative purposes only, and is not meant to be a limitation of the present invention. In some embodiments of the present invention, the NAV ignorance notice may be carried in a frame different from the frame F3. FIG. 3 is a diagram illustrating another signaling design for coordinating operations of WiFi communication devices under coordinated TDMA according to an embodiment of the present invention. The shared AP 104 receives one frame F1 transmitted from the sharing AP 102, where the frame F1 contains information about the starting and ending time of the shared period, the bandwidth of the shared TXOP, etc. In response to receiving the frame F1, the shared AP 104 transmits the aforementioned frame F2 to the sharing AP 102 for confirmation of receiving the frame F1, transmits the aforementioned frame F3 (e.g. broadcast frame) to non-AP STAs in its BSS, and further transmits one frame F4 to non-AP STAs in its BSS, where NAV ignorance notice is carried in the frame F4 that may be a trigger frame or a polling frame. Hence, for each of the group-A non-AP STAs (e.g. 106), the frame F4 contains information that notifies the non-AP STA (e.g. 106) of ignoring the NAV (which is directly set up by the sharing AP 102) during the shared period, and the frame F3 contains information that notifies the non-AP STA (e.g. 106) of resuming the NAV (which is directly set up by the sharing AP 102) when the shared period ends. For each of the group-C non-AP STAs (e.g. 110), the frame F4 contains information that notifies the non-AP STA (e.g. 110) of ignoring the NAV (which is set up via the shared AP 104) during the shared period, and the frame F3 contains information that notifies the non-AP STA (e.g. 110) of setting up a NAV that is identical to that set up by the sharing AP 102, and/or resuming the NAV (which is set up via the shared AP 104) when the shared period ends.

Consider a case where the third transmission scheme is adopted by the shared AP 104 to divide the shared period into several time segments and allocate each time segment to a STA group consisting of one or more non-AP STAs in the BSS of the shared AP 104. The signaling design shown in FIG. 2 may be employed. For all non-AP STAs (e.g. 106, 108, and 110) in the BSS of the shared AP 104, the frame F3 contains information of the shared period (e.g. starting and ending time of the shared period), identification information of the sharing AP 102 (e.g. MAC address or BSS color of the sharing AP 102), and STA group information of each time segment. The STA group information of each time segment may indicate which non-AP STA(s) are allowed to use the allocated time segment. The non-AP STAs need to record the NAV owner's identification information, such that they can temporarily disable NAV set up by the NAV owner.

For each of the group-A non-AP STAs (e.g. 106), the frame F3 further contains information that notifies the non-AP STA (e.g. 106) of ignoring the NAV (which is directly set up by the sharing AP 102) during the allocated time segment (which is a part of the shared period), being free to perform channel contention during the allocated time segment, resuming the NAV (which is directly set up by the sharing AP 102) when the allocated time segment ends, and/or limiting UL transmission within the allocated time segment when winning the channel contention.

For each of the group-B non-AP STAs (e.g. 108), the frame F3 further contains information that notifies the non-AP STA (e.g. 108) of respecting one or more NAVs not set up by the sharing AP 102 (i.e. no transmission during NAV(s)) during the allocated time segment (which is a part of the shared period), and/or allowing of channel contention after one or more NAVs not set up by the sharing AP 102 end and before the allocated time segment ends.

For each of the group-C non-AP STAs (e.g. 110), the frame F3 further contains information that notifies the non-AP STA (e.g. 110) of setting up a NAV that is identical to that set up by the sharing AP 102, ignoring the NAV (which is set up via the shared AP 104) during the allocated time segment (which is a part of the shared period), being free to perform channel contention during the allocated time segment, resuming the NAV (which is set up via the shared AP 104) when the allocated time segment ends, and/or limiting UL transmission within the allocated time segment when winning the channel contention.

In one alternative design, for each of the group-C non-AP STAs (e.g. 110), the frame F3 contains information that notifies the non-AP STA (e.g. 110) of being free to perform channel contention during the allocated time segment (which is a part of the shared period). That is, the non-AP STA (e.g. 110) can contend the wireless medium as normal operations, without addition instructions from the shared AP 104. In another alternative design, for each of the group-C non-AP STAs (e.g. 110), the frame F3 contains information that notifies the non-AP STA of being free to perform channel contention during the allocated time segment (which is a part of the shared period), and/or limiting the UL transmission within the allocated time segment when winning the channel contention.

Figure 4:
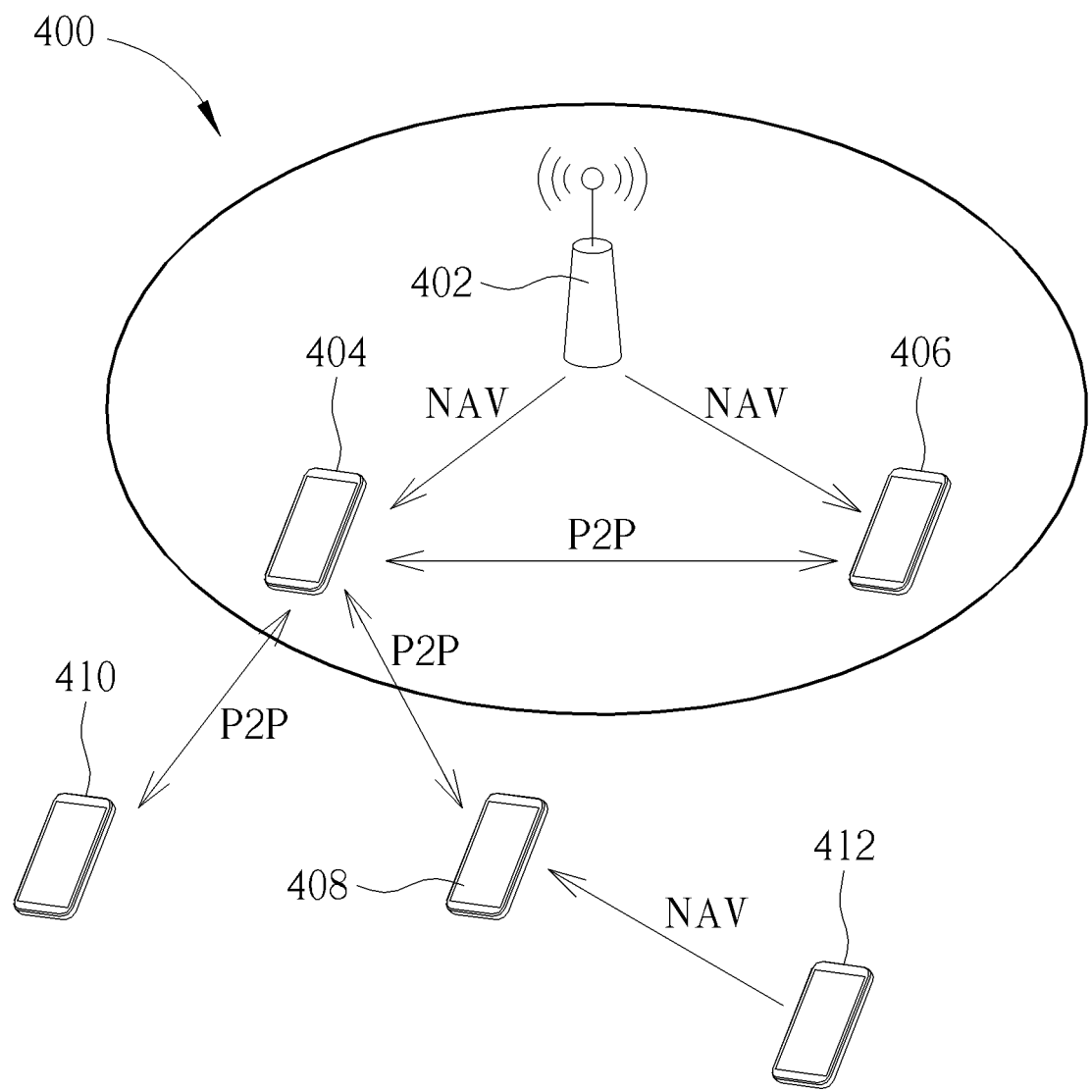
FIG. 4 is a diagram illustrating another WiFi system with coordinated TDMA according to an embodiment of the present invention.

FIG. 4 is a diagram illustrating another WiFi system with coordinated TDMA according to an embodiment of the present invention. The WiFi system. 400 is composed of a plurality of WiFi communication devices, including a sharing AP 102, a shared non-AP STA 404, other non-AP STAs 406, 408, 410, and one WiFi communication device 412 that may be an AP or a non-AP STA. The same signaling concept employed by the WiFi system 100 may be applied to the WiFi system 400. Specifically, the shared non-AP STA 404 shown in FIG. 4 may function as the shared AP 104 shown in FIG. 1 for receiving a message from a sharing AP and transmitting a message to non-AP STA(s). The shared non-AP STA 404 is associated to the sharing AP 402, and is within the BSS of the sharing AP 402. When the sharing AP 402 obtains TXOP and is willing to share a part of a time period of its TXOP to the shared non-AP STA 404 which intends to do peer-to-peer (P2P) communication with other non-AP STA(s) (e.g. 406, 408, and/or 410). The sharing AP 402 may send a message to inform the shared non-AP STA 404. In this embodiment, the message may be unicasted to the shared non-AP STA 404, and may be a frame containing information of shared TXOP parameters. For example, the frame from the sharing AP 402 to the shared non-AP STA 404 contains information about the starting and ending time of the shared period, the bandwidth of the shared TXOP, etc.

The shared non-AP STA 404 is aware of TXOP obtained by the sharing AP 402 and NAV set up by the sharing AP 402, and is also aware of the shared period it is allowed to use. The P2P target STA's NAV can be in three different conditions during the shared period. In a first condition, a type-A P2P target STA (e.g. 406) receives the NAV set up by the sharing AP 402 and set its NAV synchronized with the sharing AP 402. In a second condition, a type-B P2P target STA (e.g. 408) does not receive the NAV set up by the sharing AP 402 and sets its NAV from a neighboring AP or non-AP STA (e.g. 412), where the NAV not set up by the sharing AP 402 partially or fully overlaps the shared period. Ina third condition, a type-C P2P target STA (e.g. 410) does not set up any NAV.

The shared non-AP STA 404 can utilize the shared period (which is a subset of the time period of TXOP obtained by sharing AP 402) for P2P communication. For example, the signaling design shown in FIG. 2 may be employed. Hence, the shared non-AP STA 404 receives one frame F1 transmitted from the sharing AP 402, where the frame F1 contains information about the starting and ending time of the shared period, the bandwidth of the shared TXOP, etc. In response to receiving the frame F1, the shared non-AP STA 404 transmits one frame F2 to the sharing AP 402 for confirmation of receiving the frame F1, and then transmits another frame (e.g. unicast frame) F2 to one P2P target STA. It should be noted that the frame F2 is to respond to the frame F1 only, and carries no other information of the shared TXOP.

For any P2P target STA, the frame F3 contains information of the shared period (e.g. starting and ending time of the shared period) and identification information of the sharing AP 402 (e.g. MAC address or BSS color of the sharing AP 402). The P2P target STA needs to record the NAV owner's identification information, such that it can temporarily disable NAV set up by the NAV owner.

For the type-A P2P target STA (e.g. 406), the frame F3 further contains information that notifies the non-AP STA (e.g. 406) of ignoring the NAV (which is directly set up by the sharing AP 402) during the shared period, and/or resuming the NAV (which is directly set up by the sharing AP 402) when the shared period ends.

For the type-B P2P target STA (e.g. 408), the frame F3 further contains information that notifies the non-AP STA (e.g. 408) of respecting one or more NAVs not set up by the sharing AP 402 (i.e. no transmission during NAV(s)) during the shared period.

For the type-C P2P target STA (e.g. 410), the frame F3 further contains information that notifies the non-AP STA (e.g. 410) of setting up a NAV that is identical to that set up by the sharing AP 402, ignoring the NAV (which is set up via the shared non-AP STA 404) during the shared period, and/or resuming the NAV (which is set up via the shared AP 404) when the shared period ends.

Alternatively, the shared non-AP STA 404 may divide the shared period into several time segments and allocate each time segment to a STA group consisting of one P2P target STA. For any P2P target STA, the frame F3 contains information of the shared period (e.g. starting and ending time of the shared period), identification information of the sharing AP 402 (e.g. MAC address or BSS color of the sharing AP 402), and STA group information of each time segment. The STA group information of each time segment may indicate which P2P target STA is allowed to use the allocated time segment. The P2P target STAs needs to record the NAV owner's identification information, such that it can temporarily disable NAV set up by the NAV owner.

For the type-A P2P target STA (e.g. 406), the frame F3 further contains information that notifies the non-AP STA (e.g. 406) of ignoring the NAV (which is directly set up by the sharing AP 402) during the allocated time segment (which is a part of the shared period), and/or resuming the NAV (which is directly set up by the sharing AP 402) when the allocated time segment ends.

For the type-B P2P target STA (e.g. 408), the frame F3 further contains information that notifies the non-AP STA (e.g. 408) of respecting one or more NAVs not set up by the sharing AP 402 (i.e. no transmission during NAV(s)) during the allocated time segment (which is a part of the shared period).

For the type-C P2P target STA (e.g. 410), the frame F3 further contains information that notifies the non-AP STA (e.g. 410) of setting up a NAV that is identical to that set up by the sharing AP 402, ignoring the NAV (which is set up via the shared non-AP STA 404) during the allocated time segment (which is a part of the shared period), and/or resuming the NAV (which is set up via the shared non-AP STA 404) when the allocated time segment ends.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shared WiFi communication device, arranged to:
receive a first frame transmitted from a sharing WiFi communication device that obtains a transmission opportunity (TXOP), wherein the first frame is a unicast frame that is unicasted from the sharing WiFi communication device to the shared WiFi communication device and at least contains information of a shared period that is allowed to be used by the shared WiFi communication device, and the shared period is a subset of a time period of the TXOP obtained by the sharing WiFi communication device; and
transmit a second frame to a WiFi communication device, wherein the second frame at least contains the information of the shared period.

2. The shared WiFi communication device of claim 1, wherein the sharing WiFi communication device is a sharing access point (AP), the WiFi communication device is a non-AP station (STA), and the shared WiFi communication device is a shared AP arranged to share resource of the sharing AP for receiving uplink (UL) transmission from the non-AP STA that belongs to a basic service set (BSS) of the shared AP.

3. The shared WiFi communication device of claim 1, wherein the sharing WiFi communication device is a sharing access point (AP), the WiFi communication device is a non-AP station (STA), the shared WiFi communication device is a shared non-AP STA arranged to share resource of the sharing AP for performing peer-to-peer (P2P) communication with at least one another non-AP STA, and the shared non-AP STA belongs to a basic service set (BSS) of the sharing AP.

4. The shared WiFi communication device of claim 1, wherein the second frame further contains identification information of the sharing WiFi communication device.

5. The shared WiFi communication device of claim 4, wherein the identification information comprises a media access control (MAC) address of the sharing WiFi communication device or a basic service set (BSS) color of the sharing WiFi communication device.

6. The shared WiFi communication device of claim 4, wherein the second frame further contains information that notifies the WiFi communication device of:
   during at least a portion of the shared period, ignoring a network allocation vector (NAV) set up by the sharing WiFi communication device; and
   when said at least a portion of the shared period ends, resuming the NAV set up by the sharing WiFi communication device.

7. The shared WiFi communication device of claim 6, wherein the second frame further contains information that notifies the WiFi communication device of:
   being free to perform channel contention during said at least a portion of the shared period; and
   limiting uplink (UL) transmission within said at least a portion of the shared period when winning the channel contention.

8. The shared WiFi communication device of claim 6, wherein the second frame further contains information indicating that only triggered uplink (UL) transmission is allowed; and the shared WiFi communication device is further arranged to transmit a trigger frame to trigger UL transmission from the WiFi communication device.

9. The shared WiFi communication device of claim 6, wherein the shared WiFi communication device is further arranged to divide the time period into a plurality of time segments and allocate each time segment to a WiFi communication device group consisting of one or more WiFi communication devices; the second frame further contains WiFi communication device group information of each time segment; and said at least a portion of the shared period is one of the plurality of time segments.

10. The shared WiFi communication device of claim 4, wherein the shared WiFi communication device is further arranged to transmit a third frame to the WiFi communication device, and the third frame contains information that notifies the WiFi communication device of:
    during the shared period, ignoring a network allocation vector (NAV) set up by the sharing WiFi communication device.

11. The shared WiFi communication device of claim 10, wherein the second frame further contains information indicating that only triggered uplink (UL) transmission is allowed; and the shared WiFi communication device is further arranged to transmit a trigger frame to trigger UL transmission from the WiFi communication device.

12. The shared WiFi communication device of claim 10, wherein the second frame further contains information that notifies the WiFi communication device of:
    when the shared period ends, resuming the NAV set up by the sharing WiFi communication device.

13. The shared WiFi communication device of claim 1, wherein the second frame further contains information that notifies the WiFi communication device of:
    during at least a portion of the shared period, respecting at least one network allocation vector (NAV) that is not set up by the sharing WiFi communication device.

14. The shared WiFi communication device of claim 13, wherein the second frame further contains information that notifies the WiFi communication device of:
    after said at least one NAV setup ends and before said at least a portion of the shared period ends, allowing of channel contention.

15. The shared WiFi communication device of claim 13, wherein the second frame further contains information indicating that only triggered uplink (UL) transmission is allowed; and the shared WiFi communication device is further arranged to transmit a trigger frame to trigger UL transmission from the WiFi communication device.

16. The shared WiFi communication device of claim 13, wherein the shared WiFi communication device is further arranged to divide the time period into a plurality of time segments and allocate each time segment to a WiFi communication device group consisting of one or more WiFi communication devices; the second frame further contains WiFi communication device group information of each time segment; and said at least a portion of the shared period is one of the plurality of time segments.

17. The shared WiFi communication device of claim 1, wherein the second frame further contains information that notifies the WiFi communication device of:
    setting up a network allocation vector (NAV) that is identical to that set up by the sharing WiFi communication device;
    during at least a portion of the shared period, ignoring the NAV set up via the shared WiFi communication device; and
    when said at least a portion of the shared period ends, resuming the NAV set up via the shared WiFi communication device.

18. The shared WiFi communication device of claim 17, wherein the second frame further contains information that notifies the WiFi communication device of:
    being free to perform channel contention during said at least a portion of the shared period; and
    limiting uplink (UL) transmission within said at least a portion of the shared period when winning the channel contention.

19. The shared WiFi communication device of claim 17, wherein the second frame further contains information indicating that only triggered uplink (UL) transmission is allowed; and the shared WiFi communication device is further arranged to transmit a trigger frame to trigger UL transmission from the WiFi communication device.

20. The shared WiFi communication device of claim 17, wherein the shared WiFi communication device is further arranged to divide the time period into a plurality of time segments and allocate each time segment to a WiFi communication device group consisting of one or more WiFi communication devices; the second frame further contains WiFi communication device group information of each time segment; and said at least a portion of the shared period is one of the plurality of time segments.

21. The shared WiFi communication device of claim 1, wherein the second frame further contains information that notifies the WiFi communication device of:
    being free to perform channel contention during said at least a portion of the shared period.

22. The shared WiFi communication device of claim 21, wherein the second frame further contains information that notifies the WiFi communication device of:

limiting uplink (UL) transmission within said at least a portion of the shared period when winning the channel contention.

23. The shared WiFi communication device of claim 21, wherein the shared WiFi communication device is further arranged to divide the time period into a plurality of time segments and allocate each time segment to a WiFi communication device group consisting of one or more WiFi communication devices; the second frame further contains WiFi communication device group information of each time segment; and said at least a portion of the shared period is one of the plurality of time segments.

24. A method for sharing resources of a sharing WiFi communication device, comprising:
   receiving a first frame transmitted from the sharing WiFi communication device that obtains a transmission opportunity (TXOP), wherein the first frame is a unicast frame that is unicasted from the sharing WiFi communication device to a shared WiFi communication device and at least contains information of a shared period that is allowed to be used by the shared WiFi communication device, and the shared period is a subset of a time period of the TXOP obtained by the sharing WiFi communication device; and
   in response to receiving the first frame, transmitting a second frame to the sharing WiFi communication device for confirmation of receiving the first frame, and further transmitting a third frame to a WiFi communication device, wherein the third frame at least contains the information of the shared period.

* * * * *